(No Model.) 2 Sheets—Sheet 1.

N. WEILER.
STEERING DEVICE FOR TRACTION ENGINES.

No. 559,643. Patented May 5, 1896.

WITNESSES,
M. M. Wiles.
M. J. Wiles.

INVENTOR,
Nick Weiler
By John E. Wiles,
ATTORNEY.

(No Model.) 2 Sheets—Sheet 2.

N. WEILER.
STEERING DEVICE FOR TRACTION ENGINES.

No. 559,643. Patented May 5, 1896.

WITNESSES,
M. M. Wiles.
M. J. Wiles.

INVENTOR,
Nick Weiler,
By John E. Wiles,
ATTORNEY.

UNITED STATES PATENT OFFICE.

NICK WEILER, OF MILWAUKEE, WISCONSIN.

STEERING DEVICE FOR TRACTION-ENGINES.

SPECIFICATION forming part of Letters Patent No. 559,643, dated May 5, 1896.

Application filed May 31, 1895. Renewed March 19, 1896. Serial No. 583,984. (No model.)

*To all whom it may concern:*

Be it known that I, NICK WEILER, a citizen of the United States, residing at Milwaukee, county of Milwaukee, State of Wisconsin, have invented a certain new and useful Improvement in Steering Devices for Traction-Engines; and I declare the following to be a full, clear, and exact description of the same, such as will enable others skilled in the art to which it pertains to make and use the same, reference being had to the accompanying drawings, which form a part of this specification.

My invention relates to new and useful improvements in the construction of steering devices for traction-engines, and the object of my invention is to provide a steering device adapted to be actuated by the movement of the truck or carrying wheels, and the construction being such that the operation of the steering mechanism is, within certain limits, automatic or self-regulating.

The various features of my improvement will be hereinafter described, and set forth in the appended claims.

Figure 1:
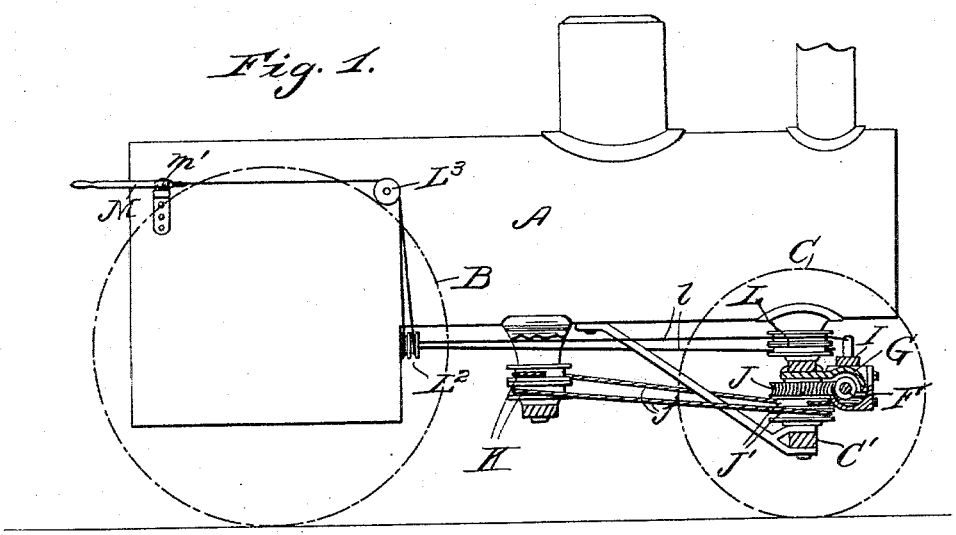
Figure 2:
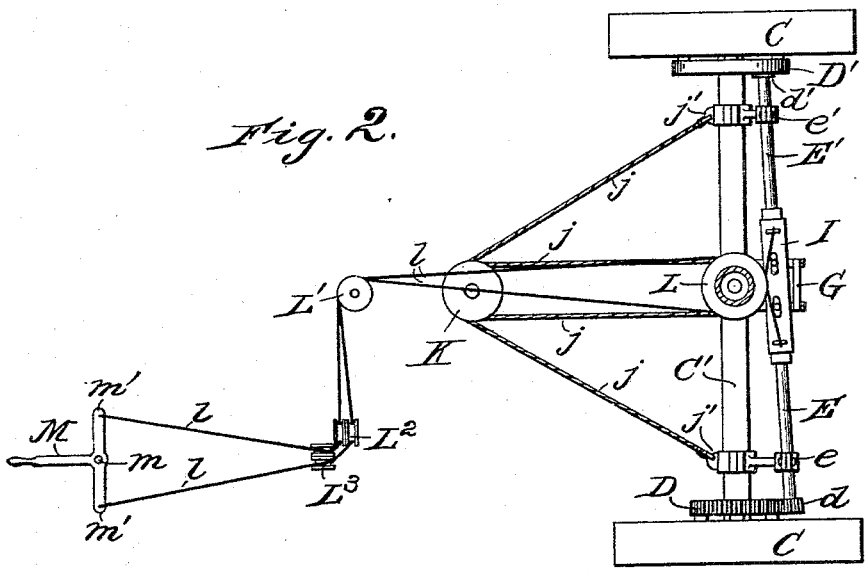
Figure 3:
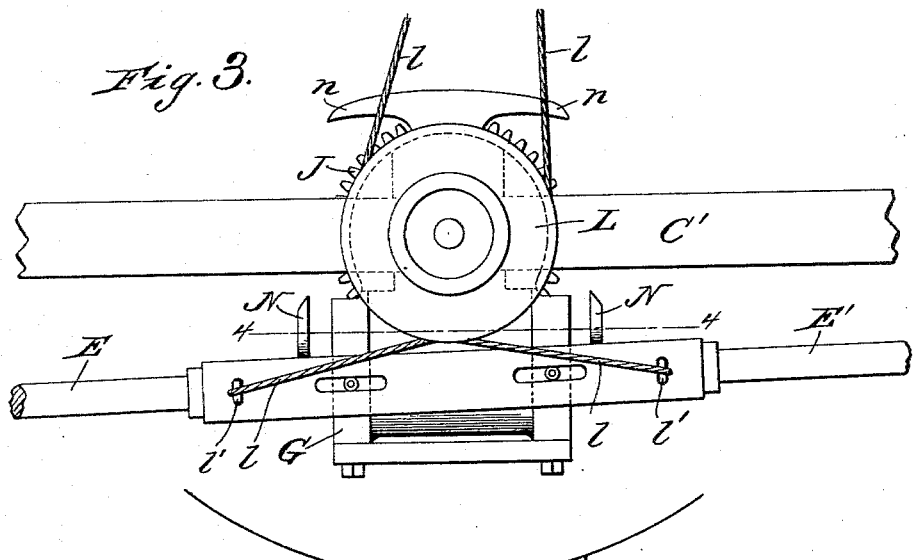
Figure 4:
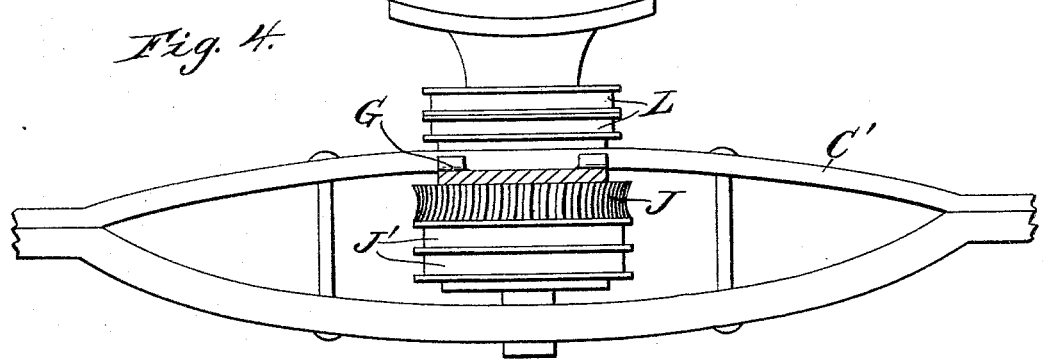
Figure 5:
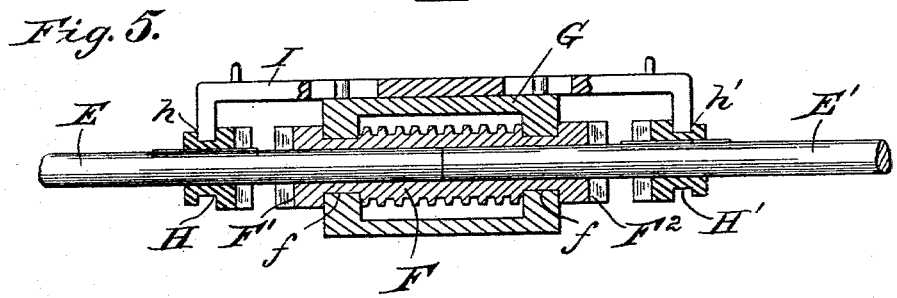

In the accompanying drawings, illustrating my invention, Figure 1 is a side elevation of a traction-engine provided with my improved steering apparatus. Fig. 2 is a plan view of the front truck of a traction-engine, illustrating the arrangement of the steering device as applied thereto. Fig. 3 is a detail plan view of the actuating mechanism, showing the means for automatically throwing the steering apparatus out of gear when it approaches the limit of its movement in either direction. Fig. 4 is a front elevation of the same. Fig. 5 is a sectional view of the clutch mechanism and the actuating-worm.

Referring by letter to said drawings, A designates the boiler, B the traction-wheels, and C the front carrying wheels or truck, to which the steering device is applied. The axle $C'$, upon which the wheels C C are mounted, is supported in the usual manner beneath the forward end of the boiler A in any ordinary manner, and is adapted to be partially rotated upon said support in the ordinary manner.

Upon the truck-wheels C C are provided gears D and $D'$, the former being preferably provided with external and the latter with internal teeth, and pinions $d$ and $d'$, respectively, are arranged to mesh with said gearwheels. The shafts E and $E'$ of the pinions $d$ and $d'$ are arranged to rotate within bearings $e$ and $e'$, respectively, which are provided upon the axle $C'$. These shafts E and $E'$ are arranged to abut against each other at their inner ends. A worm F is sleeved onto the abutting inner ends of said shafts E $E'$, as shown more particularly in Fig. 5, and is mounted in bearings $f\ f$ in a support or casing G, which is secured to the axle $C'$, and serves to retain said worm in position. The support or casing G is arranged, as shown, so as to permit a free rotation of the worm F and at the same time to prevent longitudinal movement of said worm. The worm-sleeve thus forms a support for the abutting inner ends of the shafts E and $E'$, while normally permitting free rotation of said shafts therein.

Upon the outer ends of the worm-sleeve are provided clutch members $F'$ and $F^2$ for imparting rotary movement to the worm, as will be presently described.

Upon the shafts E and $E'$ are provided clutch members H and $H'$, respectively, which are arranged adjacent to the clutch members $F'$ and $F^2$ and are adapted for engagement therewith. The clutch members H and $H'$ are respectively splined or feathered upon the shafts E and $E'$, so as to have positive rotations therewith. A suitable yoke I has a movable engagement with the casing G, as shown, and is engaged at its opposite ends, as at $h\ h'$, with the clutch members H $H'$. By a longitudinal movement of the yoke I either one of the movable clutch members may be brought into engagement with the corresponding clutch member upon the worm-sleeve. A worm-wheel J is journaled upon the axle $C'$ and is arranged to mesh with the worm F, and the winding drums or pulleys $J'\ J'$ are secured to said worm-wheel and arranged to rotate in unison therewith. It follows from this construction that by the engagement of the pinions $d$ and $d'$ with the gear-wheels D and $D'$ opposite rotations will be imparted to the shafts E and $E'$ and the clutch members H and $H'$, so that if either of the movable clutch members be brought into engagement with the corresponding clutch member upon the worm-sleeve a rotation will be imparted to the worm-sleeve in the same direction as the rotation of the shaft and the movable clutch member with which it is engaged. Thus by a longitudinal adjustment of the yoke I a rotation in either desired direction may be imparted to the worm-sleeve F and a desired rotary movement thus communicated to the worm-wheel J and the winding drums or pulleys J' J'.

As shown more particularly in Figs. 1 and 2, suitable ropes, chains, or cables $j\,j$ are engaged, as at $j'\,j'$, with opposite ends of the axle C' and extend rearwardly around carrying pulleys or idlers K K, journaled in any convenient manner beneath the boiler, each of these ropes, chains, or cables being carried forward and attached at its other end to one of the winding drums or pulleys J'. It follows from this construction that by imparting a rotation to the worm F, the worm-gear J, and the winding drums or pulleys J' J' in the proper direction the ropes, chains, or cables $j\,j$ may be actuated so as to simultaneously wind up one of the same upon the winding drum or pulley J' and to unwind the other rope, chain, or cable therefrom. This operation will obviously serve to strain or draw one rope, chain, or cable backward over the idler K and to thereby force the end of the axle C' with which it is connected rearwardly, the other rope, chain, or cable being permitted to pay out so as to allow the other end of the axle C' to move forwardly. In this manner the axle C' may be adjusted so as to steer or guide the machine either to the right or to the left according to the direction of the adjustment of the yoke I and the movable clutch members. It is obvious, also, that when the yoke I occupies an intermediate position, as illustrated in Fig. 5, both of the clutches will be free from engagement with the worm-sleeve F, and therefore their rotation will not affect said worm-sleeve and said sleeve will remain stationary.

When it is desired to advance the machine straight ahead, the yoke I and the movable clutch members are adjusted to the position shown in Fig. 5, so as to permit of a free rotation of the pinions $d$ and $d'$ in opposite directions without affecting the worm, the worm-gear, and the winding-drums actuated thereby. When, however, it is desired to steer or guide the machine either to the right or to the left, the yoke I is adjusted so as to bring the proper clutch member into engagement with the worm-sleeve, so as to produce a rotation of the latter and to wind or draw in the rope, chain, or cable connected with the end of the axle C' upon the side toward which it is desired to turn the machine. When the axle C' has been sufficiently adjusted, the steering device may be thrown out of operation by a movement of the yoke I to its described intermediate position. Any suitable or desired means may be employed for enabling the engineer to readily effect these adjustments of the yoke and the movable clutch members; but for this purpose I find it convenient to provide pulleys L L, arranged concentrically with respect to the pivotal support of the axle C', and ropes or cables $l\,l$ being passed around said pulleys L L from opposite directions and connected, as at $l'\,l'$, with the yoke I. As shown more particularly in Figs. 1 and 2, these ropes or cables are carried rearwardly and around an idler L' beneath the central part of the boiler and thence laterally over idlers $L^2$, upwardly over idlers $L^3$ and rearwardly, and engaged at their extremities with a suitable operating-lever M. This lever may be of any convenient form, but is made conveniently of the form shown in Figs. 1 and 2, being of a substantially T shape and pivotally supported as at $m$. Each of the ropes or cables $l\,l$ is connected, as at $m'$, with one of the laterally-extending arms of the T-shaped lever M. It follows from this construction that by a movement of the free end of the lever M to the right or to the left one of the ropes or cables $l$ will be retracted and the other relaxed to a corresponding extent. Thus movement is communicated throughout the length of said ropes or cables and will produce a longitudinal adjustment of the yoke I to the right or to the left according to the direction of movement of the lever, thereby bringing one or the other of the movable clutch members into operative engagement with the clutch member upon the end of the worm-sleeve. This adjustment of the parts serves to move the axle C' about its pivotal support, so as to steer or guide the machine in the desired direction.

Any suitable or desired means may be provided for automatically disengaging the clutch mechanism when the limit of adjustment of the axle has been reached, so as to prevent accident or damage to the machine. To this end I prefer to provide upon opposite ends of the yoke I suitable projections N N, adapted for engagement with projections $n\,n$ upon the worm-gear J. As shown more particularly in Fig. 3, these projections $n\,n$ are arranged to engage with the respective projections N N upon the yoke when the worm-gearing approaches the limit of its movement in either direction. It follows from this construction that when the worm-gearing has been adjusted sufficiently to effect the described partial rotation of the axle C' to about the limit of its movement upon its pivotal support the projection $n$ will serve, by its engagement with the projection N, to adjust the yoke I longitudinally and thereby disengage the clutch mechanism from the worm-gearing. It will of course be understood that this operation of the parts does not always take place when the steering mechanism is set in motion, but that said automatic operation takes place only when said parts have been adjusted to or near to the limit of movement in either direction, thereby serving to guard against accident in case the engineer should fail to shift the lever at the proper moment. Of course, where slight adjustments are desired, to produce slight deviations from the direct line of advancement of the machine, the lever M is adjusted both to throw the clutch mechanism into operation and to again disengage said clutch mechanism when the proper degree of adjustment has been obtained.

As shown more particularly in Figs. 1, 3, and 5 of the drawings, the casing G, within which the worm-sleeve F is journaled, is arranged to practically surround or inclose said worm-sleeve, and the lower part of said casing is conveniently arranged to hold a supply of oil or other lubricant, in which the lower side of the worm-sleeve is immersed. This enables the worm-gearing to operate very freely and with comparatively little friction.

Various modifications may of course be made in the details of construction of my improved steering device, and I would therefore have it understood that I do not desire to limit myself to the exact form of construction shown and herein described, it being only one of a large number of forms of construction which might be employed. I would therefore have it understood that my invention contemplates the use of the oppositely-rotating pinions deriving their motion from the front carrying or truck wheels, and adapted for operative connection with the gearing which adjusts the front axle, and any desired form of connecting device or devices adapted for adjustment by hand to throw a desired one of said pinions into or out of operative connection with said worm-gearing.

Having thus described my invention, what I claim as new, and desire to secure by Letters Patent of the United States, is—

1. A steering device for traction-engines comprising a winding-drum journaled upon the pivotal support of the front axle of the engine, ropes, chains, or cables operatively connected with said winding-drum, and extending rearwardly over idler-pulleys and connected with opposite ends of said front axle, gears secured to the carrying or truck wheels, pinions engaging respectively with said gears and adapted for opposite rotation thereby, and suitable means for operatively connecting either of said pinions with said winding-drum, substantially as described.

2. A steering device for traction-engines comprising the winding-drum upon the pivotal support of the front axle of the engine, carrying pulleys or idlers supported beneath the boiler in rear of said drum, ropes passing over said drum and said idlers and connected with opposite ends of said front axle, a worm-wheel secured to said drum, an actuating-worm operatively engaged therewith, gears upon the front truck-wheels, pinions operatively engaged therewith, and oppositely rotated thereby, clutch mechanism upon the shafts of said pinions adapted for engagement with said actuating-worm, and suitable means for moving either clutch into or out of engagement therewith, substantially as described.

3. A steering device for traction-engines comprising a winding-drum journaled upon the pivotal support of the front axle of the engine, idler-pulleys located in rear thereof, ropes, chains or cables extending over said drum and said idler-pulleys, and connected with opposite ends of said front axle, internal and external gears located respectively upon the opposite ones of the front truck-wheels, pinions meshing therewith, and provided upon their shafts with movable clutch members, a worm-wheel secured to the winding-drum, an actuating-worm sleeved upon the inner ends of the shafts of both pinions, and provided on its outer ends with clutch members and suitable means for throwing either of said movable clutch members into or out of operative engagement with said actuating-worm, substantially as described.

4. A steering device for traction-engines comprising a winding-drum journaled upon the pivotal support of the front axle of the engine, ropes, chains, or cables operatively connected with said winding-drum, and extending rearwardly over idler-pulleys and connected with opposite ends of said front axle, gears secured to the carrying or truck wheels, pinions engaging respectively with said gears and adapted for opposite rotation thereby, suitable means for operatively connecting either of said pinions with said winding-drum, and suitable means for automatically throwing said gearing out of operative connection with said winding-drum, at or near the limits of adjustment of the parts, substantially as described.

5. The combination with the front truck or carrying wheels of a winding-drum journaled upon the pivotal support for the axle of said front truck, ropes, chains, or cables engaged with said winding-drum, extending rearwardly over idler-pulleys, and connected with opposite ends of said axle, a worm-wheel secured thereto, an actuating-worm meshing with said wheel, and provided upon opposite ends with clutch members, gear-wheels secured to opposite wheels of the front truck, pinions engaging therewith, and oppositely rotated thereby, and having the inner ends of their axles or shafts sleeved within said actuating-worm, clutch members splined or feathered upon said shafts, a longitudinally-movable yoke engaging with both of said clutch members, and suitable means for adjusting said yoke so as to move either one of said clutch members into or out of operative engagement with the corresponding clutch member upon the actuating-worm, substantially as described.

6. The combination with the front truck or carrying wheels of a winding-drum journaled upon the pivotal support for the axle of said front truck, ropes, chains, or cables engaged with said winding-drum, extending rearwardly over idler-pulleys, and connected with opposite ends of said axle, a worm-wheel secured thereto, an actuating-worm meshing with said wheel, and provided upon opposite ends with clutch members, gear-wheels secured to opposite wheels of the front truck, pinions engaging therewith, and oppositely rotated thereby, and having the inner ends of their axles or shafts sleeved within said actuating-worm, clutch members splined or feathered upon said shafts, a longitudinally-movable yoke engaging with both of said clutch members, and projections upon said worm-wheel adapted for engagement with said yoke, and adapted to automatically adjust the same so as to disengage said clutch mechanism as the parts approach the limit of adjustment in either direction, substantially as described.

7. The combination with the front truck of a traction-engine, the adjusting-ropes, and the described actuating-gearing therefor, of the pulleys journaled concentrically with respect to the pivotal support of the front axle, the ropes, or cables engaged therewith, and operatively connected with the clutch-shifting device, and the operating-lever connected with said ropes or cables, substantially as described.

8. The combination with the front truck of a traction-engine, of gears secured to the wheels of said truck, pinions meshing therewith and having opposite rotations, a winding-drum, ropes, chains or cables connected with said winding-drum and with opposite ends of the axle of said front truck, and suitable means for throwing either one of said pinions into or out of operative connection with said winding-drum, substantially as described.

In testimony whereof I sign this specification in the presence of two witnesses.

NICK WEILER.

Witnesses:
JOHN E. WILES,
E. W. STOUT.